United States Patent [19]

Cioccolani

[11] 3,892,540

[45] July 1, 1975

[54] PRODUCING MONOCRYSTALLINE BODIES BY THE VERNEUIL METHOD

[75] Inventor: Arnaldo Cioccolani, Champl sur Drac, France

[73] Assignee: Ugine Kuhlmann, Paris, France

[22] Filed: Dec. 8, 1972

[21] Appl. No.: 313,270

Related U.S. Application Data

[63] Continuation-in-part of Ser. No. 100,577, Dec. 22, 1970, abandoned, which is a continuation-in-part of Ser. No. 584,168, Oct. 4, 1966, abandoned.

[30] Foreign Application Priority Data

Oct. 4, 1966 France..............................33.725

[52] U.S. Cl. ............................ 23/301 SP; 23/273 V
[51] Int. Cl. ........................ B01j 17/00; B01j 17/20
[58] Field of Search ...................... 23/301 SP, 273 V

[56] References Cited
UNITED STATES PATENTS

| | | | |
|---|---|---|---|
| 2,852,890 | 9/1958 | Drost et al. ............................ | 23/301 |
| 2,962,838 | 12/1960 | Kebler et al. ........................... | 23/301 |
| 3,077,752 | 2/1963 | Drost et al. ............................. | 23/301 |
| 3,205,046 | 9/1965 | Djevahirdjian........................ | 23/301 |

Primary Examiner—Norman Yudkoff
Assistant Examiner—Frank Sever
Attorney, Agent, or Firm—Pennie & Edmonds

[57] ABSTRACT

A flame fusion process for the production of synthetic monocrystalline bodies which comprises horizontally supporting a monocrystalline rod at each end of its axis within a furnace, the rod having at least one radially enlarged portion thereon, passing powdered material of the same composition as the rod through a flame to fuse the same, directing the flame at the outer periphery of the radially enlarged portion of the rod thereby depositing and building up the fused material by crystallization on such outer periphery, rotating the rod about its axis at a rate fast enough so that the part of the outer periphery of the radially enlarged portion of the rod which is in contact with the flame is in the molten state thereby resulting in a radially outwardly enlarging crystal of increasing diameter and varying the distance between the flame and the outer periphery of the radially enlarged portion of the rod as the diameter of the crystal increases to maintain a predetermined relationship between the flame and such outer periphery.

8 Claims, 2 Drawing Figures

INVENTOR
Arnaldo Cioccolani
BY Pennie, Edmonds,
Morton, Taylor and Adams
ATTORNEYS

PRODUCING MONOCRYSTALLINE BODIES BY THE VERNEUIL METHOD

Cross Reference to Related Application

This application is a continuation-in-part of the parent Application Ser. No. 100,577 filed Dec. 22, 1970, which was a continuation-in-part of Ser. No. 584,168 filed Oct. 4, 1966, both now abandoned.

DESCRIPTION OF PRIOR ART

Synthetic monocrystalline bodies of certain materials such as corundum (with or without "doping" in the form of a few per cent of impurities such as chromic oxide or iron compounds and titania), and spinels and garnets have been manufactured by the Verneuil flame fusion process. This process involves the melting of a substance such as alumina powder in an oxy-hydrogen torch and having the melted powder drop onto a monocrystalline seed of the same nature held on a movable support which is aligned beneath the dropping melt. The seed crystal grows by accretion of the molten droplets, and is known as a "boule." By carefully controlling the conditions of temperature and powder flow and by retracting the boule from the flame during growth, an elongated single crystal is made to grow which may have a diameter of approximately 2 cm. or less. This crystal can be machined into various desired shapes such as thin plates, but it has been heretofore difficult to grow crystals of diameter larger than about 2 cm.

Attempts have been made to produce by modifications of the Verneuil process, synthetic monocrystalline bodies of flattened shape having diameters greater than 2 cm. In one such modification, it has been suggested to allow the molten powder to drop onto a monocrystalline rod secured at one end of its axis to a revolving shaft and rotating the rod about its axis at a rate fast enough to bring each point on the outer edge of the crystal back under the flame while it is still molten. Such a process is disclosed in U.S. Pat. No. 2,852,890. In another similar process disclosed in Russian Pat. No. 136,724, the monocrystalline rod is horizontally supported at each end of its axis. It has further been suggested that two or more torches be positioned symmetrically to the axis of rotation, and that the speed of rotation of the shaft be adjusted to the growth in diameter of the disc. Discs of uniform thickness, large diameter and exacting optical qualities have been difficult to obtain, however, by means of these modifications of the Verneuil technique.

SUMMARY OF THE INVENTION

This invention relates to the production of synthetic monocrystalline bodies. The invention provides a process for the production of bodies of this type in the form of discs and other shapes having a large diameter, by growing the body on at least one enlarged portion on a rotating monocrystalline rod of the same material as that of the body to be grown, this rod or enlarged portion acting as a seed for the deposition of a like material. The invention also provides an apparatus useful in the practice of the process thereof.

I have discovered a method for producing synthetic monocrystalline bodies of uniform thickness having a greater diameter than that previously attainable by methods existing heretofore. In accordance with the method of the present invention a monocrystalline rod is horizontally supported at each end of its axis within a furnace, the rod having at least one radially enlarged portion thereon. This enlarged portion of the rod acts as a seed upon which the desired monocrystalline body is grown, and whose crystallographic axis, relative to its geometric axis, has the desired orientation. The rod is positioned horizontally in the furnace in such a manner that its extremities project outside the furnace for engagement with driving means for rotating the rod about its horizontal axis. Each radially enlarged or swollen portion of the rod is positioned in alignment with the flame of a torch; such as an oxy-hydrogen torch, which projects into the furnace. A powdered material of the same composition as the rod is passed through the torch flame to fuse the same and the hottest part of this flame is directed substantially vertically downward against the outer periphery of the enlarged portion of the rod thereby depositing and building up the fused material by crystallization on such outer periphery. At the same time, the rod is rotated about its axis at a rate fast enough so that the portion of the outer periphery of the enlarged portion of the rod which is in contact with the flame is in a sufficiently molten state to produce a radially outwardly enlarging crystal of increasing diameter regardless of the condition of the other portions of the periphery of the crystal being grown which are not directly under the flame.

The process of this invention can also be advantageously practiced by rotating the rod about its axis at a rate fast enough to bring each point on the outer edge of the crystal back under the flame while it is still molten such as described in the Drost U.S. pat. No. 2,852,890. As the boule forms at the enlarged portion of the rod in the general shape of a disc, the outer periphery of the enlarged portion of the rod is retracted from the flame to maintain a predetermined relationship between the flame and such outer periphery so that the portion of the enlargement or boule in contact with the flame is maintained sufficiently molten to effect fusion of the powder to allow the crystal to grow and prevent over heating of the boule as it is being formed.

The size and shape of the enlargement or swelling is not critical. The enlargement for example can be square, rectangular or cylindrical and is preferably from about 1.5 to 2 times the diameter of the rod all of which will be readily apparent to one skilled in the art.

The monocrystalline rod of this invention is selected from among elongated monocrystals obtained by means of a known method, such selection being based on the crystallization orientation desired. The crystallization orientation of the monocrystal may be determined by known technique, as by X-ray analysis. The elongated monocrystal selected is then machined to provide a cylindral axis with at least one enlargement or swelling thereon. This enlargement or swelling may be of varied geometry, as for example, conical, cylindrical, square or retangular.

In addition to providing synthetic monocrystalline bodies of uniform thickness and diameters greater than that heretofore possible, the process of this invention yields additional advantages which will be clear to one skilled in the art. Modern methods of transmitting radiations require monocrystals having precise optical qualities and varying shapes, and in particular, flattened discs. The optical qualities of the monocrystal are related to the regularity of crystallization and the precision with which the crystalline lattice is oriented with regard to the faces of the flattened discs. Utilizing the process of this invention, one may conveniently and advantageously obtain various shaped monocrystalline bodies of large diameters and uniform thickness possessing precise optical qualities with a crystalline lattice with the same orientation as that of the swelling of the seed rod.

DESCRIPTION OF THE PREFERRED EMBODIMENT

Figure 1:
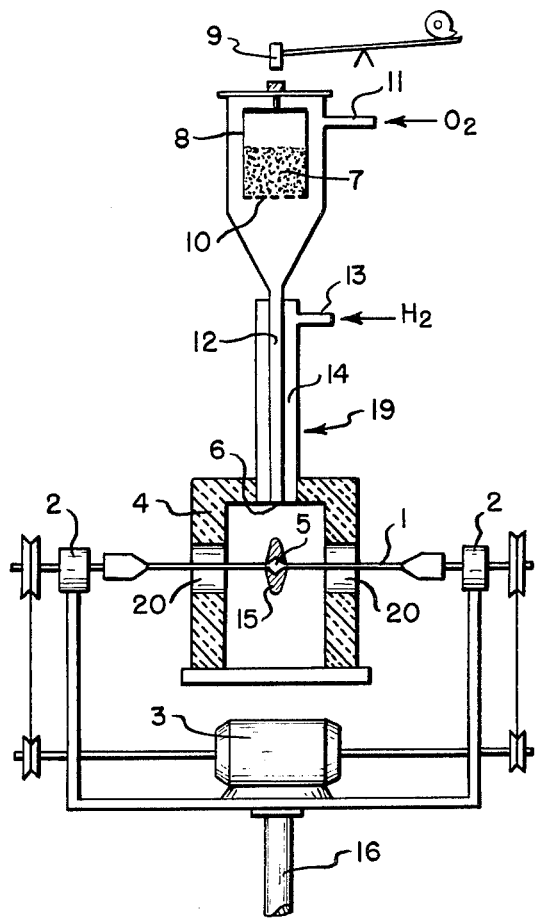
Figure 2:
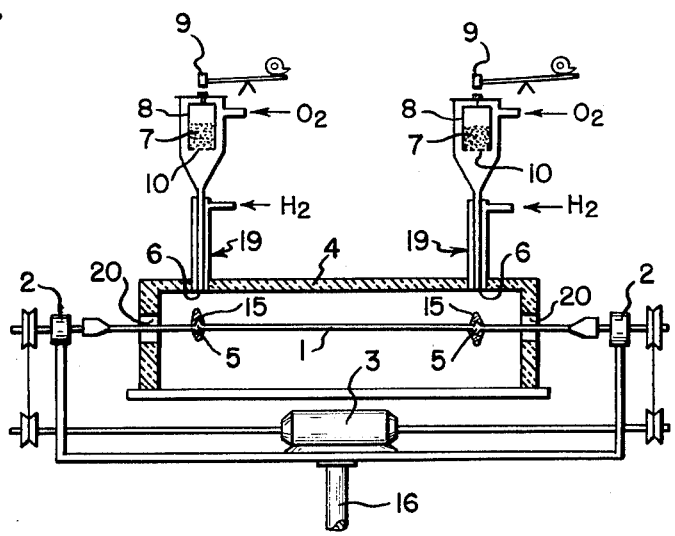

The invention will now be further described with reference to the accompanying drawings in which:

FIG. 1 is a schematic representation showing an apparatus according to the invention for the production of a boule in the form of a large diameter disc; and FIG. 2 is a schematic representation of an apparatus according to the invention for the simultaneous production of two such discs.

Referring to FIG. 1, a monocrystalline seed rod 1 is supported in a horizontal position at each end of its axis by bearings 2. It is driven in rotation by a motor 3 and a transmission system coupled thereto. The rod 1, which passes through a furnace 4, has a radially enlarged or swollen portion 5 within the furnace which acts as a seed in the growth process. A flame fusion torch and feed assembly generally indicated at 19 is mounted on the furnace at an opening 6 therein, at which point is formed the flame from the torch which comprises an inner passage 12 for oxygen and a surrounding annular passage 14 for hydrogen. The powder 7 used in the growth of the crystal, and which is of the same material as the rod 1, is contained in a hopper 8 which is equipped with a striker or percussion device 9 that intermittently causes the powder to drop through mesh screen 10. The seed rod 1 is positioned within the furnace so that the enlarged portion 5 is aligned directly beneath the flame at opening 6.

The powder is thus fed into an oxygen stream which enters the apparatus through port 11. Hydrogen is fed to the flame through port 13 which leads to annular passage 14. The powder melts as it falls through the flame extending downwardly from the mouth of the torch at 6, and the rod is initially positioned at such a height that the flame fuses that part of the radially enlarged portion 5 which is instantaneously uppermost as the rod revolves. The molten powder falling into this molten part of the rod becomes integrated into the swelling, which gradually grows into a disc as indicated at 15 with the same orientation of the crystalline lattice as that of the swelling. The small molten portion of the outer periphery of the enlargement, and later of the disc, continuously emerges from the flame as the rod rotates, to be replaced in the flame by an adjacent part of the periphery. With continued rotation of the rod and continued feed of powder into the flame, and with a gradual lowering of the rod with respect to the flame to keep the upper limit of the growing mass in substantially the same position with respect to the flame, the initial swelling grows into a disc as indicated at 15. The openings through which the rod passes through the side walls of the furnace may be elongated vertically as indicated at 20 to permit such relative vertical motion. In the figure, the rod, motor and transmission are shown supported on a stem 16, movable up and down in controlled fashion by mechanism not shown. The result is a disc-shaped body which with the enlarged portion 5 and the part of rod 1 comprised therein, constitutes a monocrystalline mass whose final crystallographic orientation is the same as that of the enlargement portion 5 or the rod.

FIG. 2 shows an apparatus similar to that of FIG. 1 except that the furnace is equipped with two torches and powder feed assemblies, and except that the rod 1 has initially two radially enlarged portions 5 thereon, each aligned with one of the torches. In the apparatus of FIG. 2 as in that of FIG. 1, a suitable gaseous atmosphere different from air, such as hydrogen, may be maintained. In the embodiment of FIG. 2 means are provided for lowering the rod with respect to the torch flames, just as in FIG. 1.

In forming the crystals according to the process described herein, fusion occurs only at the surface of the boules without affecting the center of the support, thus preventing a decrease in the mechanical strength of the rod. In addition, the fact that the rod contains the enlarged portions and is supported in rotation at each end of its axis makes it possible to produce discs of higher unit weight by increasing their diameter and/or by increasing their thickness. The method of this invention is also applicable to any materials where elongated seed rods can be grown. For example, such materials as pure or doped corundum, spinel, rutile, and garnets may be grown by the method of this invention.

EXAMPLE

A monocrystalline support comprising a rod of sapphire, i.e., of doped corundum, of a diameter of 10 mms. and a length of 20 cms. was supported at each of its extremities by a bearing, the extremities of the rod being situated outside a furnace. The speed of rotation of the rod was maintained at 100 r.p.m. on the average. Approximately 900 g. of alumina in powder form was fed to the torch over a period of 12 hours or at a rate of 75 g. per hour on the average. The torch and powder were both directed to the enlarged portions of the rod as shown in the drawing and the distance of the enlarged portion from the flame was sufficient to maintain the enlargement and crystal being formed in a sufficiently molten state to effect fusion of the powder thereto.

The enlarged portion of the rod was gradually lowered during the process so as to maintain that portion of the crystal being grown upon which the powder is being deposited in a sufficiently molten state to effect fusion of the powder thereon. In this particular case the distance of the crystal from the flame was maintained so that the entire periphery of the crystal being formed was maintained in the molten state. A body in the form of a disc, integral with the corresponding part of the support, was thereby produced around the support. After severing the support at the axial ends of the disc, a monocrystalline body was obtained in the form of a disc weighing approximately 450 g. having a diameter of 120 mms. and a thickness of 10 mms. The crystallographic orientation of this disc was determined relative to that of the initial supporting rod; the angular variation of these orientations did not exceed 1° in absolute value at any point of the disc.

It will be seen that the invention provides a flame fusion process for the growth of synthetic monocrystalline bodies. The process of this invention comprises the steps of horizontally supporting a monocrystalline rod at each end of its axis within a furnace, the rod having at least one radially enlarged portion thereon, passing powdered material of the same composition as the rod through a flame to fuse the same, directing the flame at the outer periphery of the radially enlarged portion of the rod thereby depositing and building up the fused material by crystallization on such outer periphery, rotating the rod about its axis at a rate fast enough so that the part of the outer periphery of the radially enlarged portion of the rod which is in contact with the flame is in a sufficiently molten state to cause fusion of the powder and to produce a radially outwardly enlarging crystal of increasing diameter and varying the distance between the flame and the outer periphery of the radially enlarged portion of the rod as the diameter of the crystal increases to maintain a substantially predetermined relationship between the flame and such outer periphery.

In the presently preferred practice of the process, the rod has a radially enlarged portion at the location of initial impingement of the flame on the rod; the flame extends substantially vertically downward to melt a portion of the surface of the rod on the instantaneously uppermost part of the rod, and the rod is retracted vertically downward.

The invention further provides apparatus for the production of monocrystalline bodies. As illustrated in the drawings, the apparatus comprises a furnace 4 having a first aperture 6 in the top wall thereof and at least two second apertures 20 in the side walls of the furnace aligned with the first aperture and with each other, the second apertures being elongated vertically. It also comprises means exterior to the furnace such as the bearings 2 and motor 3 to support and to rotate a rod extending through the furnace and through those second apertures, a torch 12, 14 supported at the first aperture in position to deliver a flame to the interior of the furnace, means 8, 9 and 10 to deliver pulverulent material 7 to that flame, and means indicated at 16 to move the torch and support means vertically with respect to each other.

While the invention has been described hereinabove in terms of the presently preferred practice of the method thereof and in terms of presently preferred embodiments of the apparatus thereof, the invention itself is not limited thereto but rather comprises all modifications on and departures from the practice and embodiments so described, properly falling within the spirit and scope of the appended claims.

I claim:

1. A flame fusion process for the production of synthetic monocrystalline bodies which comprises horizontally supporting a monocrystalline rod within a furnace, the rod having been machined to provide at least one preformed radially enlarged portion to orient the lattice of the synthetic bodies, passing powdered material of substantially the same composition as the rod through a flame to fuse the same, directing the flame at the outer periphery of the preformed radially enlarged portion of the rod thereby depositing and building up the fused material by crystallization on such outer periphery, rotating the rod about its axis at a rate fast enough so that the part of the outer periphery of the radially enlarged portion of the rod which is in contact with the flame is in a sufficiently molten state to produce a radially outwardly enlarging crystal of increasing diameter, and varying the distance between the flame and the outer periphery of the radially enlarged portion of the rod as the diameter of the crystal increases to maintain a predetermined relationship between the flame and such outer periphery whereby a monocrystalline body having a diameter of as much as about 120 mms. may be produced.

2. A flame fusion process for the production of synthetic monocrystalline discs which comprises machining a monocrystal to the shape of a cylindrical rod having at least one radially enlarged portion thereon, placing the monocrystalline rod in a Verneuil type furnace having two laterally opposed openings therein through which each end of the rod projects and rests on a support exterior to the furnace, slowly rotating the crystal to pass each part of the outer periphery of the radially enlarged portion of the rod which has been previously preformed by machining through the hottest part of the flame contained within the furnace, applying a fused powder of the same composition as the rod to the outer periphery of the preformed radially enlarged portion of the rod by the Verneuil method thereby fusing the molten powder to the preformed enlarged portion to provide a monocrystal of increasing diameter, progressively adjusting the distance between the flame and the outer periphery of the radially enlarged portion of the rod to maintain the latter in the hottest part of the flame, very slowly cooling the monocrystal after it has achieved the desired diameter and machining the monocrystal to the dimensions of the disc sought whereby a monocrystalline body having a diameter of as much as about 120 mms. may be produced.

3. The process of claim 1 in which the enlarged portion of the rod is rotated at a rate fast enough to bring each point on the outer edge of the crystal being formed back under the flame while it is still molten.

4. The process according to claim 1 wherein said flame is directed substantially vertically downward upon the outer periphery of the radially enlarged portion of the rod.

5. The process according to claim 3 wherein the flame is the flame of an oxy-hydrogen torch.

6. The process according to claim 1 wherein the monocrystalline rod has a plurality of radially enlarged portions thereon and a like plurality of flames directed at the outer periphery of each such enlarged portions.

7. A process according to claim 1 in which said rod is a monocrystalline body composed of one member of the group consisting of pure corundum, doped corundum, spinel, garnets and rutile and in which said powdered material is composed of the same member of said group.

8. The process of claim 1 including supporting said rod at each end of its axis.

* * * * *